US010411421B2

(12) United States Patent
Rehmer et al.

(10) Patent No.: US 10,411,421 B2
(45) Date of Patent: Sep. 10, 2019

(54) ELECTRICAL DISTRIBUTION SYSTEM AND METHODS OF ASSEMBLING SAME

(71) Applicant: ABB Schweiz AG, Baden (CH)

(72) Inventors: Dennis James Rehmer, Bristol, CT (US); Justin Dubrosky, Bristol, CT (US); Tyler Braden Diomedi, Plainville, CT (US); Jeremy Robert Baillargeon, Southington, CT (US); Mariusz Duda, Berlin, CT (US)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 15/892,023

(22) Filed: Feb. 8, 2018

(65) Prior Publication Data

US 2018/0331479 A1    Nov. 15, 2018

Related U.S. Application Data

(60) Provisional application No. 62/504,349, filed on May 10, 2017.

(51) Int. Cl.
*H02B 1/21* (2006.01)
*H01R 25/16* (2006.01)
*H02B 1/20* (2006.01)
*H02G 5/00* (2006.01)
*H02B 1/056* (2006.01)

(52) U.S. Cl.
CPC ............ *H01R 25/162* (2013.01); *H02B 1/20* (2013.01); *H02B 1/21* (2013.01); *H02G 5/005* (2013.01); *H02G 5/007* (2013.01); *H02B 1/056* (2013.01)

(58) Field of Classification Search
CPC ... H02B 1/21; H02B 1/22; H02B 1/04; H02B 1/48; H01R 25/142; H01R 25/145
USPC ................................. 361/624, 641, 634, 652
See application file for complete search history.

(56) References Cited

U.S. PATENT DOCUMENTS

| 4,405,189 | A |   | 9/1983  | Douty |
|-----------|---|---|---------|-------|
| 5,172,300 | A | * | 12/1992 | Morby ................... H02B 1/056 361/637 |
| 5,213,518 | A |   | 5/1993  | Weidler |
| 5,510,960 | A | * | 4/1996  | Rosen .................. H01R 9/2425 361/624 |
| 5,894,405 | A |   | 4/1999  | Fleege |
| 6,650,024 | B2|   | 11/2003 | Yamane |

(Continued)

FOREIGN PATENT DOCUMENTS

EP        2619853 B1    11/2016

*Primary Examiner* — Hien D Vu
(74) *Attorney, Agent, or Firm* — Barnes & Thornburg LLP

(57) ABSTRACT

An electrical distribution system includes a housing coupled to a bus bar assembly. The bus bar assembly includes a plurality of bus bars and a plurality of insulators. The housing includes a rear wall defining a plurality of ports and a plurality of notches, and a plurality of sidewalls extending from the rear wall to a front of the housing, the rear wall and the plurality of sidewalls defining an interior space of the housing, the plurality of sidewalls cooperatively defining an opening opposite the rear wall, the plurality of bus bars aligned with the plurality of ports, and the plurality of insulators received in the plurality of notches. The system further includes a neutral connector, and a conductor electrically coupling the neutral connector to a bus bar of the plurality of bus bars through a port of the plurality of ports.

19 Claims, 7 Drawing Sheets

(56) References Cited

U.S. PATENT DOCUMENTS

| | | |
|---|---|---|
| 7,092,244 B2 | 8/2006 | Eppe |
| 7,649,731 B2 | 1/2010 | Parrish |
| 7,656,648 B2 | 2/2010 | Cant |
| 8,873,223 B2 * | 10/2014 | Rahn .................... H02B 1/0565 200/50.21 |
| 9,117,614 B2 * | 8/2015 | Rahn ........................ H02B 1/04 |
| 9,327,657 B2 | 5/2016 | Murata |
| 9,979,164 B2 * | 5/2018 | Baillargeon ............. H02B 1/20 |
| 2017/0040788 A1 | 2/2017 | Paolozzi |

* cited by examiner

ELECTRICAL DISTRIBUTION SYSTEM AND METHODS OF ASSEMBLING SAME

CROSS-REFERENCE TO RELATED APPLICATIONS

This application claims the benefit of U.S. Provisional Patent Application No. 62/504,349, filed on May 10, 2017, the disclosure of which is hereby incorporated by reference in its entirety.

BACKGROUND

The field of the disclosure relates generally to electrical distribution systems, and more particularly, to electrical distribution systems including a housing for coupling electrical devices to a bus bar assembly.

In at least some known electrical distribution systems, components of the bus bar assembly, such as circuit breakers, are connected to power connectors to electrically power devices. For example, such power connectors can include terminals, lugs, bus bars, and other connectors. However, the components generally have different form factors from one another. As a result of varying form factors, the components are connected to the power connectors in different configurations. Thus, to accommodate these different configurations, contractors or operators connecting these electrical components to power connectors must be familiar with a variety of different form factors for electrical components. Naturally, the added complexity of requiring familiarity with differing configurations for a variety of electrical components increases the cost to assemble the electrical distribution systems.

Accordingly, a need exists for a more universal electrical device assembly that allows for a uniform connection of different electrical components having differing form factors.

BRIEF DESCRIPTION

In one aspect, an electrical distribution system is provided. The electrical distribution system includes a bus bar assembly including a plurality of bus bars and a plurality of insulators, wherein each insulator of the plurality of insulators is located between adjacent bus bars of the plurality of bus bars. The system further includes a housing coupled to the bus bar assembly, the housing including a rear wall defining a plurality of ports and a plurality of notches, wherein each notch of the plurality of notches is located between adjacent ports of the plurality of ports, and a plurality of sidewalls extending from the rear wall to a front of the housing, the rear wall and the plurality of sidewalls defining an interior space of the housing, the plurality of sidewalls cooperatively defining an opening opposite the rear wall, the plurality of bus bars aligned with the plurality of ports, and the plurality of insulators received in the plurality of notches. The system further includes a neutral connector coupled within the housing, and a conductor electrically coupling the neutral connector to a bus bar of the plurality of bus bars, the conductor extending through a port of the plurality of ports that is aligned with the bus bar.

In another aspect, a housing for use in an electrical distribution system is provided. The housing is coupleable to a bus bar assembly including a plurality of bus bars and a plurality of insulators, wherein each insulator of the plurality of insulators is located between adjacent bus bars of the plurality of bus bars. The housing includes a rear wall defining a plurality of ports and a plurality of notches, wherein each notch of the plurality of notches is located between adjacent ports of the plurality of ports, a plurality of sidewalls extending from the rear wall to a front of the housing, the rear wall and the plurality of sidewalls defining an interior space of the housing, the plurality of sidewalls cooperatively defining an opening opposite the rear wall, wherein, when the housing is coupled to the bus bar assembly, the plurality of bus bars are aligned with the plurality of ports, and the plurality of insulators are received in the plurality of notches. The housing further includes an insert positioned in the interior space, the insert arranged to support a neutral connector within the interior space such that an end of the neutral connector is aligned with a port of the plurality of ports.

In yet another aspect, a method of assembling an electrical distribution system is provided. The method includes coupling a neutral connector within an interior space of a housing, the housing including a rear wall defining a plurality of ports and a plurality of notches, wherein each notch of the plurality of notches is located between adjacent ports of the plurality of ports, the housing further including a plurality of sidewalls extending from the rear wall to a front of the housing, the rear wall and the plurality of sidewalls defining the interior space, the plurality of sidewalls cooperatively defining an opening opposite the rear wall. The method further includes coupling the housing to a bus bar assembly including a plurality of bus bars and a plurality of insulators, wherein each insulator of the plurality of insulators is located between adjacent bus bars of the plurality of bus bars, wherein the plurality of bus bars are aligned with the plurality of ports, and wherein the plurality of insulators are received in the plurality of notches. The method further includes electrically coupling the neutral connector to a bus bar of the plurality of bus bars, the neutral connector electrically coupled to the bus bar through a slot of the plurality of slots that is aligned with the bus bar.

Although specific features of various embodiments may be shown in some drawings and not in others, this is for convenience only. Any feature of any drawing may be referenced and/or claimed in combination with any feature of any other drawing.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Exemplary embodiments of distribution systems and methods of manufacturing distribution systems are described herein. The distribution systems generally include a housing arranged to receive a first electrical device and a second electrical device within an interior space. The housing allows the first electrical device to connect to a bus bar assembly of the distribution system when the first electrical device is received in the housing and allows the second electrical device connect to the bus bar assembly when the second electrical device is received within the interior space. Accordingly, the housing enables electrical devices having different sizes and/or shapes to connect to the bus bar assembly. As a result, the housing reduces the cost to assemble the electrical distribution systems.

Figure 1:
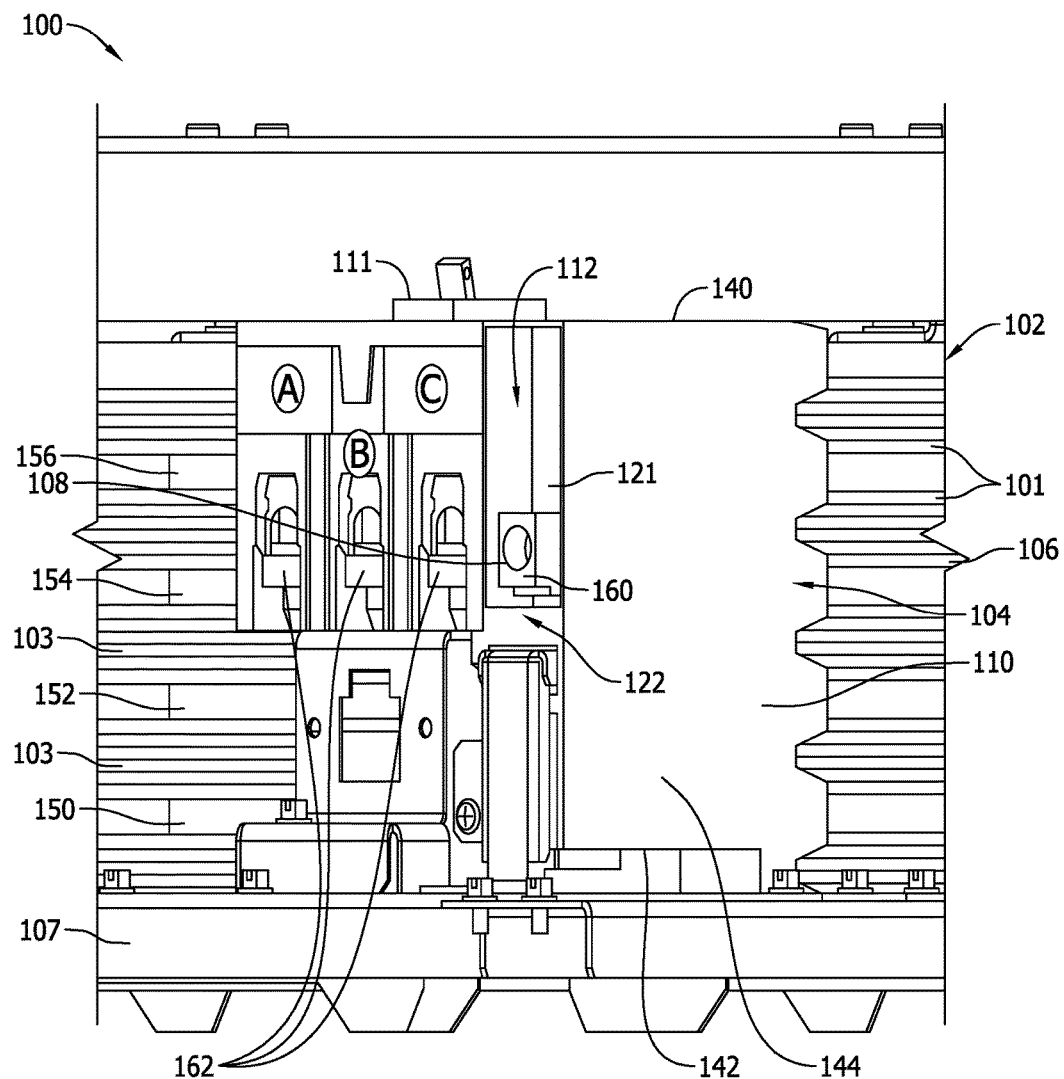
FIG. 1 is a perspective view of an exemplary electrical distribution system including a bus bar assembly and an electrical device assembly.

FIG. 1 is a perspective view of an exemplary electrical distribution system 100 including a bus bar assembly 102 and an electrical device assembly 104. In the exemplary embodiment, bus bar assembly 102 includes a plurality of stacked bus bars 106 and a bus bar support 107. In the exemplary embodiment, electrical device assembly 104 is coupled to bus bar assembly 102. In the exemplary embodiment, electrical device assembly 104 includes an electrical device 108 and a housing 110. In addition, in the exemplary embodiment, an external electrical device 111 is coupled to bus bar assembly 102 adjacent electrical device assembly 104. In the exemplary embodiment, electrical device 108 is a neutral connector similar to the first electrical device 208 (shown in FIG. 7). In the exemplary embodiment, external electrical device 111 is a three-pole circuit breaker. In alternative embodiments, any suitable electrical devices may be coupled to bus bars 106. During operation of electrical distribution system 100, bus bar assembly 102 is arranged to provide current through electrical device 108 and/or external electrical device 111. In alternative embodiments, electrical distribution system 100 includes any bus bar assembly 102 that enables electrical distribution system 100 to operate as described herein.

In the exemplary embodiment, bus bars 106 include four bus bars 150, 152, 154, 156. In the exemplary embodiment, bus bars 150, 152, 154, 156 are aligned with one another in a vertical direction. Each bus bar 150, 152, 154, 156 is configured to be coupled to one phase of a multi-phase power supply. In the exemplary embodiment, each bus bar 150, 152, 154, 156 includes a pair of conductive plates 101. In alternative embodiments (not pictured), each bus bar 150, 152, 154, 156 includes only a single conductive plate 101. In the exemplary embodiment, insulators 103 are positioned between adjacent bus bars 106 (i.e., bus bars 106 having opposite polarity). Insulators 103 electrically isolate adjacent bus bars 106 from one another. In further alternative embodiments, bus bars 150, 152, 154, 156 include any number of conductive plates 101 that enables electrical distribution system 100 to operate as described herein. In the exemplary embodiment, bus bars 106 are coupled to a bus bar support 107. In alternative embodiments (not pictured), bus bars 106 may be arranged between side rails coupled to a power source. In further alternative embodiments, bus bars 106 may be supported in any manner that enables the bus bars 106 to operate as described herein.

Further, in the exemplary embodiment, bus bars 106 includes three bus bars 152, 154, 156 operable to support respective phase connections and a neutral bus bar 150 operable to support a neutral connection. In alternative embodiments, bus bars 106 includes any arrangement of bus bars 150, 152, 154, 156 that enables electrical distribution system 100 to operate as described herein. For example, in some embodiments, bus bars 106 include any number of bus bars operable to support a phase connection or any number of bus bars operable to support a neutral connection. In further embodiments, electrical device assembly 104 and bus bar assembly 102 are not necessarily connected using a neutral connection or a phase connection.

In the exemplary embodiment, housing 110 includes electrical device 108 positioned within an interior space 112. In alternative embodiments, another electrical device is positioned within interior space 112. In further alternative embodiments, a plurality of electrical devices are positioned within interior space 112 of housing 110. In some embodiments, the electrical devices include, for example and without limitation, ground fault circuitry, current transformers, communications, human machine interface (HMI) and display components, circuit interrupting devices, and/or DC/AC power components.

In the exemplary embodiment, housing 110 defines ports 118 which will be described in more detail with respect to FIG. 2. Ports 118 are defined in a rear wall 123 of housing 110. Additionally, in the exemplary embodiment, housing 110 has a front 122 opposite rear wall 123. Furthermore, front 122 of housing 110 defines an access opening 121. Access opening 121 permits access into interior space 112 of housing 110.

In the exemplary embodiment, interior space 112 of housing is defined by rear wall 123 and a plurality of sidewalls, the plurality of sidewalls include a top wall 140, a left wall 144 and a right wall 146 (shown in FIG. 3), and a bottom wall 142. The plurality of sidewalls extend from rear wall 123 to front 122 of housing 110 and cooperatively define access opening 121.

In the exemplary embodiment when electrical device 108 is positioned within housing 110, a power connector 160 of electrical device 108 is located at front 122 of housing 110. In the exemplary embodiment, power connector 160 of electrical device 108 is a neutral terminal. Additionally, in the exemplary embodiment, power connectors 162 of external electrical device 111 are located adjacent power connector 160 of electrical device 108. Further, in the exemplary embodiment, power connectors 160 and 162 are located at approximately the same distance from bus bar assembly 102. In alternative embodiments, power connectors 160, 162 may have any configuration that enables housing 110 to operate as described herein.

Figure 2:
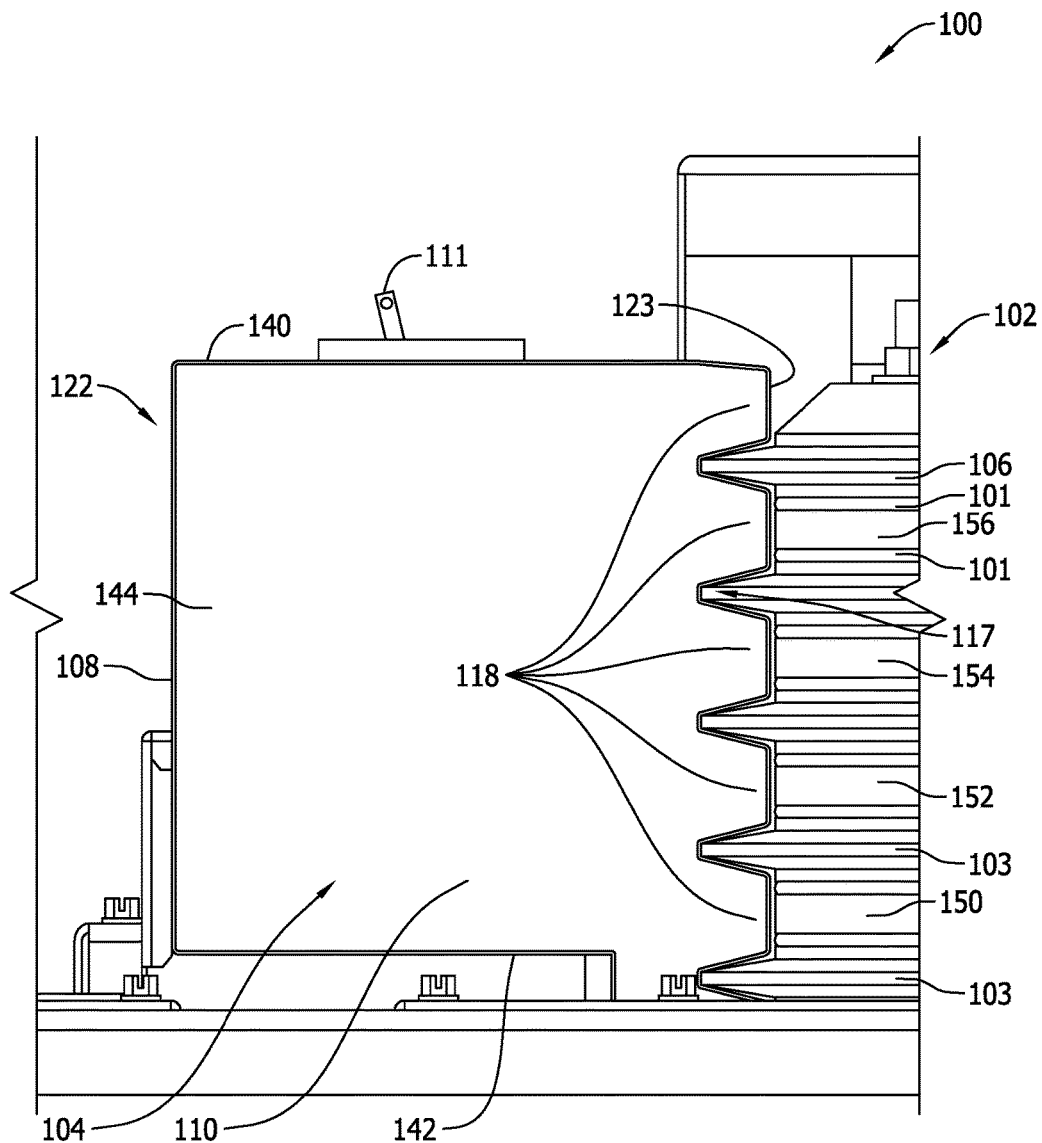
FIG. 2 is a side view of the electrical device assembly shown in FIG. 1 connected to the bus bar assembly shown in FIG. 1.

FIG. 2 is a side view of electrical device assembly 104 shown in FIG. 1 connected to bus bar assembly 102 shown in FIG. 1. Moreover, housing 110 is arranged to receive different electrical devices (e.g., electrical device 108 and other devices) within interior space 112 to facilitate different electrical devices coupling to bus bar assembly 102. For example, interior space 112 is arranged to receive electrical device 108 and additional electrical devices. In addition, housing 110 allows electrical device assembly 104 to have the same form factor when different electrical devices are received within interior space 112. Accordingly, housing 110 is modular and is compatible with a plurality of electrical devices and bus bar assemblies. Moreover, housing 110 allows the different electrical devices to couple to bus bar assembly 102 in a consistent manner. As a result, housing 110 reduces the time and cost required to assemble electrical distribution system 100.

Figure 7:
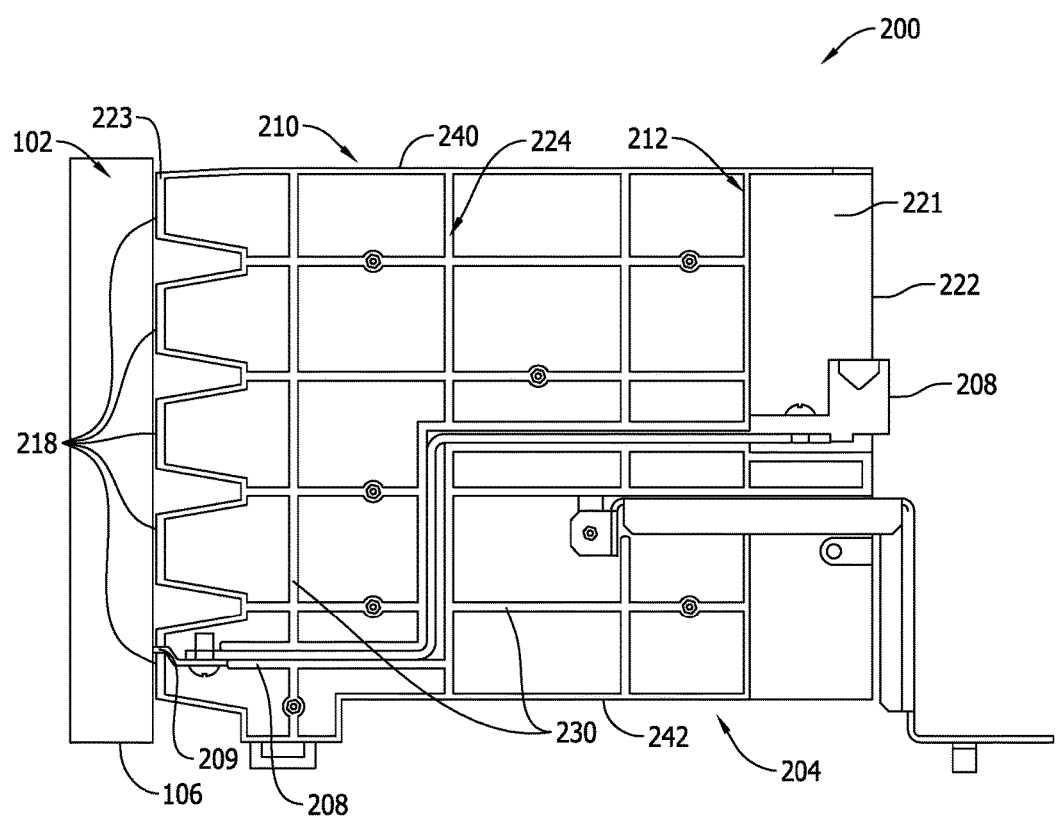
FIG. 7 is a schematic view of an exemplary electrical distribution system including an electrical device assembly coupled to the bus bar assembly shown in FIG. 1.

In the exemplary embodiment, ports 118 are defined on housing 110 to facilitate electrically coupling electrical devices positioned within interior space 112. Specifically, in the exemplary embodiment, ports 118 are aligned with bus bars 106 when housing 110 is coupled to bus bar assembly 102. In particular, at least one port 118 is arranged to allow bus bar assembly 102 to connect to electrical device 108 when electrical device 108 is positioned within interior space 112. For example, in some embodiments, a portion of electrical device 108 (such as a conductor) extends through at least one of ports 118 and connects to bus bar assembly 102. Specifically, a conductor portion, similar to conductor portion 209 (as shown in FIG. 7), of the electrical device 108 extends through a port 118 and contacts a respective conductive plate 101. Accordingly, ports 118 and conductor portion of electrical device 108 act as power connectors of electrical device 108 and allow phase connections or neutral connections to bus bar assembly 102. In alternative embodiments wherein an additional electrical device is positioned within interior space 112, ports 118 facilitate matching power connections between the additional electrical device and bus bar assembly 102.

In the exemplary embodiment, rear wall 123 of housing 110 defines five ports 118. A portion of one or more ports 118 may be removable to create an open port to allow connection of electrical device 108. For example, ports 118 may be covered with a removable material to facilitate electrically coupling electrical device 108 to bus bar assembly 102. In the exemplary embodiment, the removable material is able to be punched out. In alternative embodiments, the material may be removable in any manner which enables ports 118 to function as described herein.

In the exemplary embodiment, ports 118 are aligned with one another in a vertical direction. Additionally, ports 118 are separated from on another by notches 117 found on rear wall 123 and aligned with one another in a vertical direction. In the exemplary embodiment, notches 117 are formed by an exterior surface of rear wall 123 of housing 110. Additionally, in the exemplary embodiment, notches 117 are oriented to receive a bus bar insulator 103 therein when housing 110 is coupled to bus bar assembly 102. In alternative embodiments, notches 117 have any configuration that enables housing 110 to operate as described herein.

In the exemplary embodiment, electrical device 108 is arranged inside housing 110 such that a conductor portion of electrical device 108 extends from bus bar 150 through port 118 into housing 110. In alternative embodiments, electrical device 108 may terminate within housing 110.

Figure 3:
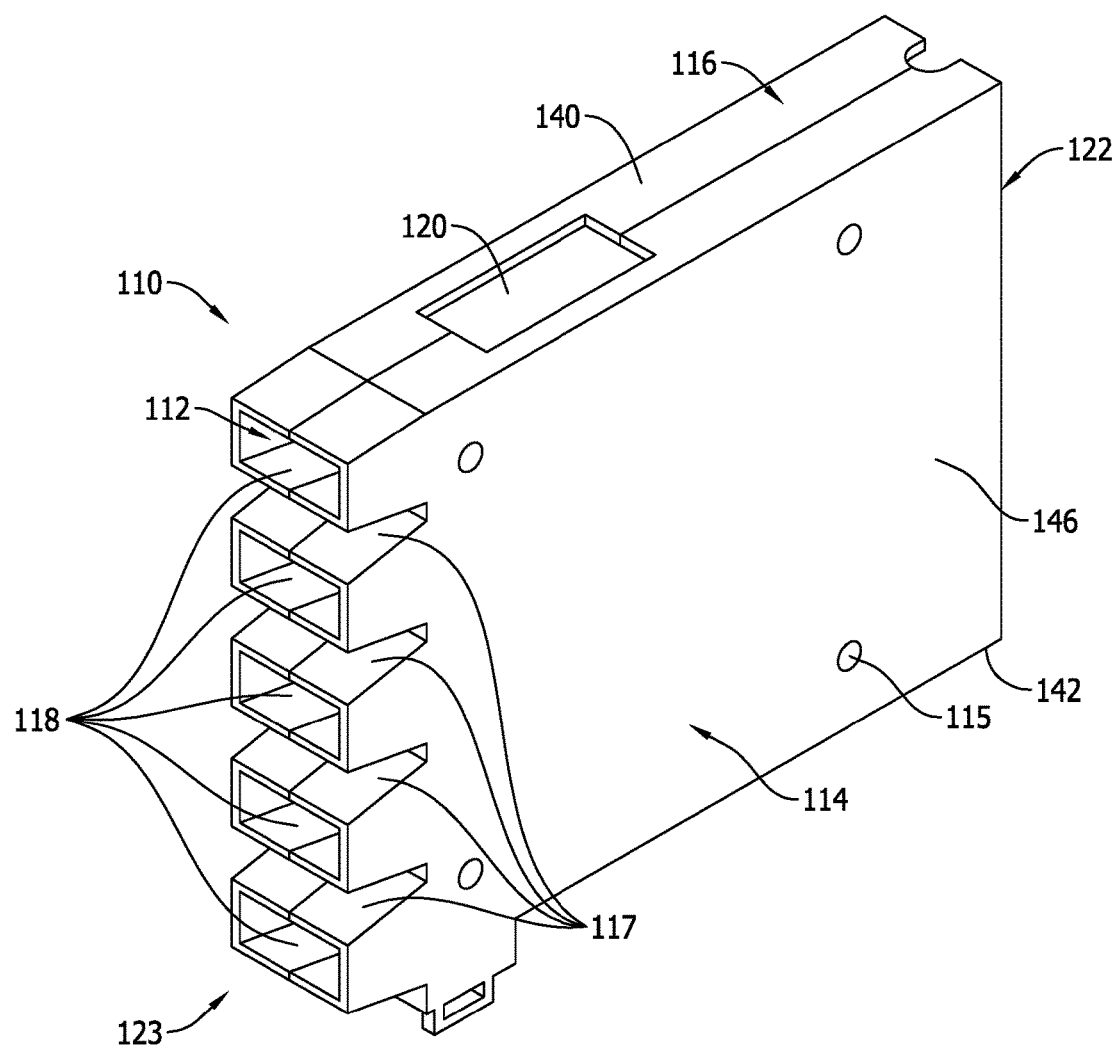
FIG. 3 is a perspective view of a housing of the electrical device assembly shown in FIG. 2.

FIG. 3 is a perspective view of housing 110 of electrical device assembly 104 shown in FIG. 2. In the exemplary embodiment, a slot 120 is defined in top wall 140 to receive a local display/HMI, a port, a connection, a device mechanism such as a breaker switch, and/or any other component. In some embodiments, such components extend through slot 120 to provide additional features for electrical device assembly 104. In alternative embodiments, housing 110 includes any port 118 or slot 120 that enables housing 110 to function as described herein.

Housing 110 includes a first portion 114 and a second portion 116 coupled together. In the exemplary embodiment first portion 114 includes right wall 146 and second portion 116 includes left wall 144. In the exemplary embodiment, first portion 114 and second portion 116 are secured by fasteners extending through openings 115. In alternative embodiments, first portion 114 and second portion 116 are secured by interlocking features located on the first portion 114 and second portion 116 and arranged to interlock with one another. In further alternative embodiments, first portion 114 and second portion 116 are secured by any feature that enables housing 110 to function as described herein. In the exemplary embodiment, first portion 114 and second portion 116 are formed of an electrically insulative material such as plastic. In alternative embodiments, housing 110 is assembled in any manner that enables housing 110 to function as described herein. For example, in some embodiments, housing 110 is formed in a single integral piece. In further embodiments, portions of housing 110 are coupled using snap or interlock features.

Figure 4:
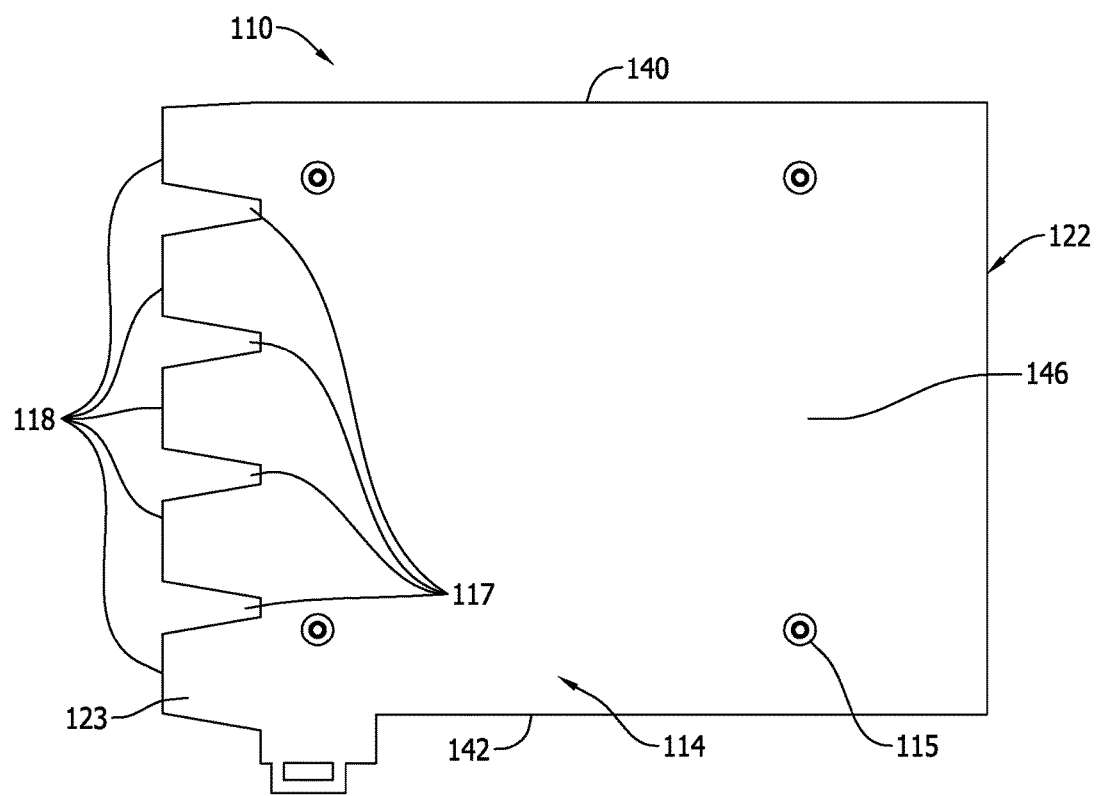
FIG. 4 is a side view of the housing shown in FIG. 3.

FIG. 4 is a side view of housing 110. In the exemplary embodiment, housing 110 defines ports 118, as described above. Ports 118 are arranged to facilitate electrically coupling electrical device 108 (shown in FIG. 1) to bus bar assembly 102 (shown in FIG. 1). In particular, at least one port 118 is arranged to allow bus bar assembly 102 to connect to electrical device 108 when electrical device 108 is positioned within interior space 112. For example, in some embodiments, a conductor portion of electrical device 108 (such as a conductor) extends through at least one of ports 118 and connects to bus bar assembly 102. Accordingly, ports 118 act as terminals of electrical device 108 and allow phase connections or neutral connections to bus bar assembly 102. In the exemplary embodiment, ports 118 allow for at least one phase and/or neutral connection to bus bar assembly 102. In particular, in the illustrated embodiment, housing 110 includes five ports 118 corresponding to four poles and a neutral connection. In addition, in some embodiments, ports 118 are used to route communication wire to other devices.

Figure 5:
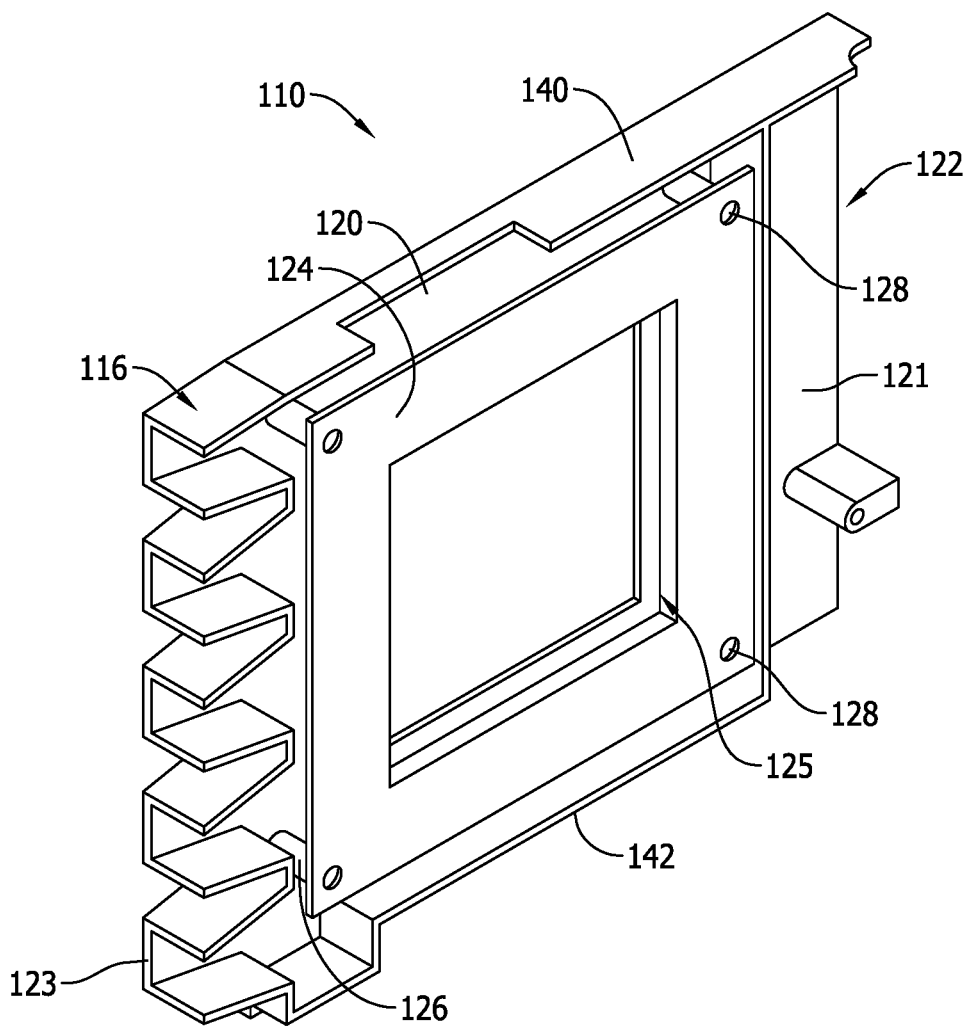
FIG. 5 is a perspective view of a portion of the housing shown in FIG. 4 including an insert.
Figure 6:
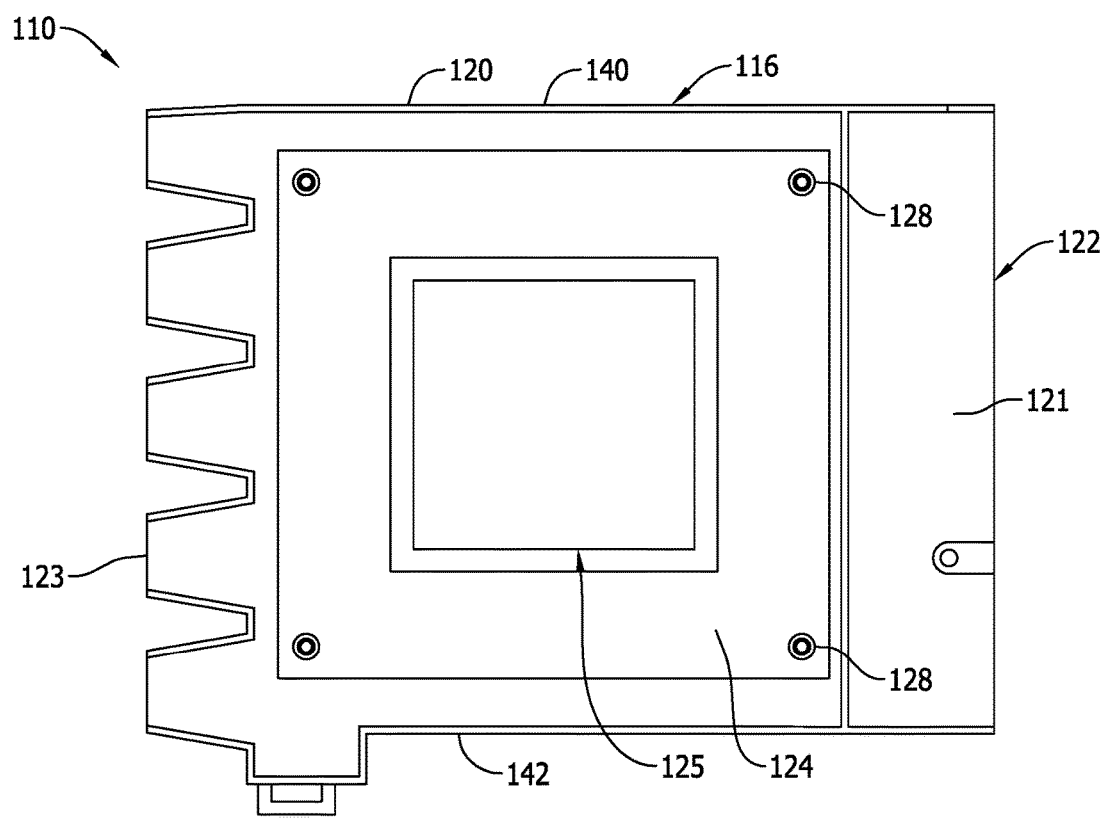
FIG. 6 is a side view of the portion of the housing shown in FIG. 5.

FIG. 5 is a perspective view of second portion 116 of housing 110 shown in FIG. 4 including an insert 124. FIG. 6 is a side view of second portion 116 of housing 110. In the exemplary embodiment, insert 124 is a mounting plate positioned within interior space 112. In alternative embodiments insert 124 may include any structure that enables insert 124 to function as described herein.

In the exemplary embodiment, insert 124 is a rectangular plate defining an inner opening 125. Fasteners 128 extend through insert 124 and couple insert 124 to housing 110. Insert 124 is arranged to receive electrical device 108. In particular, in some embodiments, electrical device 108 is mounted to insert 124 and insert 124 supports electrical device 108. Accordingly, insert 124 facilitates different electrical devices coupling to housing 110. For example, in some embodiments, insert 124 is used to connect devices such as a PCB, fuse block, and/or any other device within interior space 112. In the exemplary embodiment, insert 124 includes stand offs 126 (shown in FIG. 5) that are used to mount internal devices or accessories. In some embodiments, accessories are used with insert 124 to allow mounting of different devices within interior space 112. Insert 124 enables different devices to be mounted within interior space 112 while maintaining an exterior form factor. In alternative embodiments, electrical device 108 is positioned within interior space 112 in any manner that enables electrical device assembly 104 to function as described herein. For example, in some embodiments, a printed circuit board or other electrical accessory is mounted within interior space 112 and is arranged to electrically connect with bus bar assembly 102. In further embodiments, insert 124 is omitted.

FIG. 7 is a schematic view of an exemplary electrical distribution system 200 including an electrical device assembly 204 coupled to bus bar assembly 102 shown in FIG. 1. Electrical device assembly 204 includes a housing 210 and a first electrical device 208. Housing 210 defines an interior space 212 arranged to receive at least a first electrical device 208. Moreover, housing 210 is arranged to receive different electrical devices within interior space 212 to facilitate different electrical devices coupling to bus bar assembly 102. In the exemplary embodiment, bus bar assembly 102 includes a plurality of stacked bus bars 106 (shown in FIG. 1).

In the exemplary embodiment, an insert 224 of housing 210 includes a rib structure 230 positioned within interior space 212. Specifically, in the exemplary embodiment, rib structure 230 includes a plurality of intersecting ribs extending along a surface housing interior 212. Rib structure 230 supports first electrical device 208 and/or facilitates positioning first electrical device 208 within interior space 212. In alternative embodiments insert 224 may include any structure that enables insert to function as described herein. In the exemplary embodiment, insert 224 is integrally formed with housing 210. In alternative embodiments, insert 224 may be removably coupled to housing 210.

In the exemplary embodiment, housing 210 includes five ports 218. In the exemplary embodiment, ports 218 are defined in a rear wall 223 of housing 210. Additionally, in the exemplary embodiment, housing 210 has a front 222 opposite rear wall 223. Ports 218 may be covered with a removable material to facilitate electrically coupling first electrical device 208 to bus bar assembly 102 as described above.

In the exemplary embodiment first electrical device 208 includes a neutral connector. In addition, in the exemplary embodiment, first electrical device 208 is coupled to bus bar 150 (shown in FIG. 1). Specifically, a conductor portion, 209 of the electrical device 108 extends through a port 118 and contacts a respective conductive plate 101 of bus bar 150 (shown in FIG. 1). In alternative embodiments, electrical device 208 is coupled to bus bar assembly 102 in any manner that enables electrical distribution system 200 to operate as described herein. For example, in some embodiments, electrical device assembly 204 connects to bus bar assembly 102 using a neutral connection and/or a phase connection. In further embodiments, electrical device assembly 204 and bus bar assembly 102 are not necessarily connected using a neutral or phase connection.

In the exemplary embodiment, first electrical device 208 extends through interior space 212 of housing 210. Specifically, in the exemplary embodiment, first electrical device 208 extends from port 218 along the rib structure 230 of insert 224.

In some embodiments, housings 110 and 210 are arranged to contain multiple devices within interior spaces 112 and 212 at the same time. In addition, ports 118 and 218 allow for connections to the multiple devices. Moreover, housings 110 and 210 maintain a consistent external size and shape when the devices are positioned within interior spaces 112 and 212 even if the devices have different sizes and/or shapes from one another. In some embodiments, housings 110 and 210 may include expansion components to increase the size or allow for larger internal devices.

In the exemplary embodiment, power connectors extending through ports 118 and 218 are sized to connect at least the minimum required ampacity for the electrical device 108. In some embodiments, a size of electrical device assemblies 104 and 204 is based on the use of electrical device assemblies 104 and 204, and in some embodiments, is specifically sized to the requirements of bus bar assembly 102.

In some embodiments, electrical device assemblies 104 and 204 provide power to communication devices that are electrically connected to the electrical apparatus. For example, communication devices may include, without limitation, components such as printed circuit boards that contain chips such as processing units or memory, displays, ports such as Ethernet or USB, and any other communication port. In some embodiments, the communication devices connect other devices such as displays, alarm systems, or communicate with any other device, or wireless communication devices.

In some embodiments, housings 110 and 210 connect to a display (not shown) or human machine interface (HMI) that can be displayed locally and/or remotely and depicts various information about the electrical apparatus. In some embodiments, the display includes a power connector to connect the device to bus bar assembly 102. In some configurations, this display may contain devices such as printed circuit boards, processing or memory units, PLCS, drivers, sensors, ports such as Ethernet, USB, Wi-Fi, or any other method of communication, to gather and communicate information. In some embodiments, the display provides information such as system health, voltage, current, energy consumption, advanced features, or any other information. This information can also be communicated to other devices or displays that are not necessarily remotely connected. In some embodiments, the display can utilize any various display type and software package to provide information. In alternative embodiments, electrical distribution system 100 includes any display that enables electrical distribution system 100 to operate as described herein. For example, in some embodiments, the display does not necessarily include a local screen and may communicate to remote devices to provide the information.

In some embodiments, electrical device assemblies 104 and 204 include a fuse block or any other protection device alone or among other components used to protect devices that are located behind the fuse block. For example, in some embodiments, the fuse block limits the amount of current that can pass to the connected devices.

In some embodiments, electrical device assemblies 104 and 204 include a control power transformer or other device used to change the voltage of the electrical apparatus. Accordingly, the transformer allows bus bar assembly 102 to power any device that uses an alternative voltage to that of the electrical apparatus. In further embodiments, the control power transformer is used in conjunction with other apparatuses to electrically power devices that require a voltage other than that of bus bar assembly 102 such as a fuse block or other components.

In some embodiments, electrical device assemblies 104 and 204 include a circuit breaker or another equivalent electrical device. Housings 110 and 210 facilitate the electrical device 108 connecting to bus bar assembly 102. In addition, the modular configurations of housings 110 and 210 provide a consistent external footprint. In some embodiments, housings 110 and 210 accommodate both line and load terminals. The line terminals in some configurations are used to connect the carriage to the bus bar assembly 102. Load terminals in some configurations could be used to connect any load device, internal or external to the bus bar assembly 102, or any other electrical apparatus.

In some embodiments, housings 110 and 210 are arranged to receive electrical device 108 having first form factor and an additional electrical device having a second form factor. Housings 110 and 210 are modular and maintain a desired form factor when either of electrical device 108 and the additional electrical device are positioned within housings 110 and 210. In further embodiments, housings 110 and 210 are arranged to receive a plurality of the electrical devices. Accordingly, housings 110 and 210 enable electrical devices having different sizes and/or shapes to connect to the bus bar assembly 102. As a result, housings 110 and 210 reduces the cost to assemble the electrical distribution systems.

For example, in one embodiment, housings 110 and 210 enclose one or more electrical devices and allow the electrical devices to be coupled to bus bar assembly 102 as an assembly. Housings 110 and 210 allow the assembly to have a consistent form factor and couple to the bus bar assembly 102 in a similar manner even when housings 110 and 210 enclose different electrical devices. In addition, housings 110 and 210 define ports 118 and 218 for connections to electrical device 108 and to provide access for components of the electrical devices such as displays and/or switches.

An exemplary technical effect of the methods, systems, and apparatus described herein includes at least one of: (a) reducing cost and time required to assemble electrical distribution systems; (b) providing modular components for connecting to an plurality of stacked bus bars; (c) providing a common connection configuration for multiple devices; (d) providing a connection point for devices and/or equipment for use in initial installation and/or retrofit installation of plurality of stacked bus bars; and (e) enabling different electrical devices to have a common form factor for connecting to an plurality of stacked bus bars.

Exemplary embodiments of electrical distribution systems and methods of assembling electrical distribution systems are described above in detail. The electrical distribution systems and methods are not limited to the specific embodiments described herein but, rather, components of the electrical distribution systems and/or operations of the methods may be utilized independently and separately from other components and/or operations described herein. Further, the described components and/or operations may also be defined in, or used in combination with, other systems, methods, and/or devices, and are not limited to practice with only the electrical distribution systems and apparatuses described herein.

The order of execution or performance of the operations in the embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electrical distribution system comprising:
a bus bar assembly comprising a plurality of bus bars and a plurality of insulators, wherein each insulator of said plurality of insulators is located between adjacent bus bars of said plurality of bus bars;
a housing coupled to said bus bar assembly, said housing comprising:
a rear wall defining a plurality of ports and a plurality of notches, wherein each notch of the plurality of notches is located between adjacent ports of the plurality of ports; and
a plurality of sidewalls extending from said rear wall to a front of said housing, said rear wall and said plurality of sidewalls defining an interior space of said housing, said plurality of sidewalls cooperatively defining an opening opposite said rear wall, said plurality of bus bars aligned with the plurality of ports, and said plurality of insulators received in the plurality of notches;
a neutral connector coupled within said housing; and
a conductor electrically coupling said neutral connector to a bus bar of said plurality of bus bars, said conductor extending through a port of the plurality of ports that is aligned with said bus bar.

2. The electrical distribution system in accordance with claim 1, wherein said rear wall defines five ports.

3. The electrical distribution system in accordance with claim 1, wherein said housing further comprises a removable material covering at least one of the plurality of ports.

4. The electrical distribution system in accordance with claim 1, wherein said housing further comprises an insert positioned in the interior space, and wherein said insert supports said neutral connector within the interior space.

5. The electrical distribution system in accordance with claim 4, wherein said insert comprises a mounting plate defining an inner opening.

6. The electrical distribution system in accordance with claim 4, wherein said insert comprises a rib structure comprising a plurality of ribs extending from a sidewall of said plurality of sidewalls.

7. The electrical distribution system in accordance with claim 1, wherein said housing comprises:
a first portion comprising a first sidewall of said plurality of sidewalls; and
a second portion detachably coupled to said first portion, said second portion comprising a second sidewall of said plurality of sidewalls.

8. A housing for use in an electrical distribution system, said housing coupleable to a bus bar assembly including a plurality of bus bars and a plurality of insulators, wherein each insulator of the plurality of insulators is located between adjacent bus bars of the plurality of bus bars, said housing comprising:
- a rear wall defining a plurality of ports and a plurality of notches, wherein each notch of the plurality of notches is located between adjacent ports of the plurality of ports;
- a plurality of sidewalls extending from said rear wall to a front of said housing, said rear wall and said plurality of sidewalls defining an interior space of said housing, said plurality of sidewalls cooperatively defining an opening opposite said rear wall, wherein, when said housing is coupled to the bus bar assembly, the plurality of bus bars are aligned with the plurality of ports, and the plurality of insulators are received in the plurality of notches; and
- an insert positioned in the interior space, said insert arranged to support a neutral connector within the interior space such that an end of the neutral connector is aligned with a port of the plurality of ports;
- wherein said insert comprises a rib structure comprising a plurality of ribs extending from a sidewall of said plurality of sidewalls.

9. The housing in accordance with claim 8, wherein said rear wall defines five ports.

10. The housing in accordance with claim 8, wherein the interior space is sized to receive a plurality of electrical devices having different form factors through the opening.

11. The housing in accordance with claim 8, wherein said insert comprises a mounting plate defining an inner opening.

12. The housing in accordance with claim 8, further comprising:
- a first portion comprising a first sidewall of said plurality of sidewalls; and
- a second portion detachably coupled to said first portion, said second portion comprising a second sidewall of said plurality of sidewalls.

13. The housing in accordance with claim 8, wherein said plurality of sidewalls comprises a top wall, and wherein a slot is defined in said top wall.

14. A method of assembling an electrical distribution system, said method comprising:
- positioning a neutral connector within an interior space of a housing, the housing including a rear wall defining a plurality of ports and a plurality of notches, wherein each notch of the plurality of notches is located between adjacent ports of the plurality of ports, the housing further including a plurality of sidewalls extending from the rear wall to a front of the housing, the rear wall and the plurality of sidewalls defining the interior space, the plurality of sidewalls cooperatively defining an opening opposite the rear wall;
- coupling the housing to a bus bar assembly including a plurality of bus bars and a plurality of insulators, wherein each insulator of the plurality of insulators is located between adjacent bus bars of the plurality of bus bars, wherein the plurality of bus bars are aligned with the plurality of ports, and wherein the plurality of insulators are received in the plurality of notches; and
- electrically coupling the neutral connector to a bus bar of the plurality of bus bars, the neutral connector electrically coupled to the bus bar through a port of the plurality of ports that is aligned with the bus bar.

15. The method in accordance with claim 14, wherein positioning a neutral connector within an interior space comprises coupling the neutral connector to an insert positioned in the interior space.

16. The method in accordance with claim 15, wherein coupling the neutral connector to an insert comprises coupling the neutral connector to an insert including a mounting plate defining an inner opening.

17. The method in accordance with claim 15, wherein coupling the neutral connector to an insert comprises coupling the neutral connector to a rib structure comprising a plurality of ribs extending from a sidewall of the plurality of sidewalls.

18. The method in accordance with claim 14, wherein the housing includes five ports.

19. The method in accordance with claim 14, further comprising removing a material covering at least one of the plurality of ports defined in the housing.

* * * * *